US006457101B1

(12) United States Patent
Bauman et al.

(10) Patent No.: US 6,457,101 B1
(45) Date of Patent: Sep. 24, 2002

(54) SYSTEM AND METHOD FOR PROVIDING THE SPECULATIVE RETURN OF CACHED DATA WITHIN A HIERARCHICAL MEMORY SYSTEM

(75) Inventors: Mitchell A. Bauman, Circle Pines, MN (US); Roger L. Gilbertson, Minneapolis, MN (US); Donald R. Kalvestrand, Lonsdale, PA (US); Joseph S. Schibinger, Phoenixville, PA (US); Daniel S. Tokoly, Huntingdon Valley, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/468,050

(22) Filed: Dec. 20, 1999

(51) Int. Cl.[7] .............................................. G06F 12/08
(52) U.S. Cl. ...................... 711/122; 711/143; 711/145
(58) Field of Search ................................ 711/122, 143, 711/145

(56) References Cited

U.S. PATENT DOCUMENTS

| | | | |
|---|---|---|---|
| 4,755,930 A | * 7/1988 | Wilson et al. | 711/122 |
| 4,843,542 A | * 6/1989 | Dashiell et al. | 711/119 |
| 5,025,365 A | * 6/1991 | Mathur et al. | 711/121 |
| 5,423,016 A | * 6/1995 | Tsuchiya et al. | 711/123 |
| 6,321,296 B1 | * 11/2001 | Pescatore | 711/117 |

* cited by examiner

Primary Examiner—Reginald G. Bragdon
(74) Attorney, Agent, or Firm—Beth L. McMahon; Charles A. Johnson; Mark T. Starr

(57) ABSTRACT

A hierarchical memory structure includes a directory-based main memory coupled to multiple first storage devices, each to store data signals retrieved from the main memory. Ones of the first storage devices are further respectively coupled to second storage devices, each to store data signals retrieved from the respectively coupled first storage devices. Fetch requests to retrieve data signals are issued by ones of the storage devices to the main memory. In response, the main memory determines where the most recent data copy resides, and issues a return request, if necessary to retrieve that copy for the requesting storage device. A speculative return generation logic circuit is coupled to at least two of the first storage devices to intercept the fetch requests. In response to an intercepted request, the speculative return generation logic circuit generates a speculative return request directly to one or more of the other coupled first storage devices. This speculative return request causes any updated copies of the requested data signals that may be stored at a lower level in the hierarchical memory, to be transferred to the first storage device. If a return request for the data is then issued by the main memory in response to the fetch request, the requested data signals are resident in a first storage device, and are readily available to the main memory.

20 Claims, 8 Drawing Sheets

PROCESSING MODULE (POD)

FIG. 7

| ADDRESS | COMMAND | JOB NUMBER | BUS | TLC |
|---|---|---|---|---|
| 702 | 704 | 706 | 708 | 710 |

FIG. 8

| POD ID | ADDRESS | FUNCTION | JOB NUMBER | BUS | TLC | DESTINATION ADDRESS |
|---|---|---|---|---|---|---|
| 812 | 802 | 804 | 806 | 808 | 810 | 814 |

FIG. 9

| FETCH COMMAND (902) | SPECULATIVE RETURN FUNCTION (904) | TLC CACHE STATUS (906) | BUS PROBE (908) |
|---|---|---|---|
| FETCH COPY | NONE | N/A | N/A |
| FETCH ORIGINAL | RETURN ORIGINAL | EXCLUSIVE | EXCLUSIVE BUS PROBES |
| FETCH CONDITIONAL | RETURN COPY | EXCLUSIVE | SHARED BUS PROBES |

SYSTEM AND METHOD FOR PROVIDING THE SPECULATIVE RETURN OF CACHED DATA WITHIN A HIERARCHICAL MEMORY SYSTEM

CROSS-REFERENCE TO OTHER APPLICATIONS

The following co-pending applications of common assignee contain some common disclosure:

"A Directory-Based Cache Coherency System", filed Nov. 05, 1997, Ser. No. 08/965,004, incorporated herein by reference in its entirety;

"High-Speed Memory Storage Unit for a Multiprocessor System Having Integrated Directory and Data Storage Subsystems", filed Dec. 31, 1997, Ser. No. 09/001,588, incorporated herein by reference in its entirety; and "Directory-Based Cache Coherency System Supporting Multiple Instruction Processor and Input/Output Caches", filed Dec. 31, 1997, Ser. No. 09/001,598, incorporated herein by reference in its entirety.

BACKGROUND OF THE INVENTION

1. Field of the Invention

This invention relates generally to an improved hierarchical memory system shared between multiple processors; and more particularly, relates to a memory system that performs transfers of cached data between hierarchical levels of the memory in anticipation of receiving requests to retrieve the data, the transfers being performed so that the data is more readily available to the requester when the anticipated request is received.

2. Description of the Prior Art

Data processing systems are becoming increasing complex. Some systems, such as Symmetric Multi-Processor (SMP) computer systems, couple two or more Instruction Processors (IPs) and multiple Input/Output (I/O) Modules to shared memory. This allows the multiple IPs to operate simultaneously on the same task, and also allows multiple tasks to be performed at the same time to increase system throughput. As the number of units coupled to a shared memory increases, more demands are placed on the memory and memory latency increases. To address this problem, high-speed local memory systems, including caches and high-speed I/O buffer memories, are often coupled to one or more of the IPs for storing data signals that are copied from main memory. These memories are generally capable of processing requests faster than the main memory while also serving to reduce the number of requests that the main memory must handle. This increases system throughput.

While the use of local memories increases system throughput, it causes other design challenges. When multiple local memories are coupled to a single main memory for the purpose of temporarily storing data signals, some system must be utilized to ensure that all IPs and I/O Modules are working from the same (most recent) copy of the data. For example, if a copy of a data item is stored, and subsequently modified, in a cache memory, another IP requesting access to the same data item must be prevented from using the older copy of the data item stored either in main memory or the requesting IP's cache. This is referred to as maintaining cache coherency. Maintaining cache coherency becomes more difficult as more caches are added to the system since more copies of a single data item may have to be tracked.

Many methods exist to maintain cache coherency. Some earlier systems achieve coherency by implementing memory locks. That is, if an updated copy of data exists within a local cache or buffer memory, other processors are prohibited from obtaining a copy of the data from main memory until the updated copy is returned to main memory, thereby releasing the lock. For complex systems, the additional hardware and/or operating time required for setting and releasing the locks within main memory cannot be justified. Furthermore, reliance on such locks directly prohibits certain types of applications such as parallel processing.

Another method of maintaining cache coherency is shown in U.S. Pat. No. 4,843,542 issued to Dashiell et al., and in U.S. Pat. No. 4,755,930 issued to Wilson, Jr. et al. These patents discuss a system wherein each processor has a local cache coupled to a shared memory through a common memory bus. Each processor is responsible for monitoring, or "snooping", the common bus to maintain currency of its own cache data. These snooping protocols increase processor overhead, and are unworkable in hierarchical memory configurations that do not have a common bus structure. A similar snooping protocol is shown in U.S. Pat. No. 5,025,365 to Mathur et al., which teaches a snooping protocol that seeks to minimize snooping overhead by invalidating data within the local caches at times when other types of cache operations are not occurring. However, the Mathur system can not be implemented in memory systems that do not have a common bus structure.

Another method of maintaining cache coherency is shown in U.S. Pat. No. 5,423,016 to Tsuchiya assigned to the assignee of the current invention. The method described in this patent involves providing a memory structure called a "duplicate tag" that is associated with each cache memory. Each duplicate tag records which data items are stored within the associated cache. When a data item is modified by a processor, an invalidation request is routed to all of the other duplicate tags in the system. The duplicate tags are searched for the address of the referenced data item. If found, the data item is marked as invalid in the other caches. Such an approach is impractical for distributed systems having many caches interconnected in a hierarchical fashion because the time required to route the invalidation requests poses an undue overhead.

For distributed systems having hierarchical memory structures, a directory-based coherency system becomes more practical. Directory-based coherency systems utilize a centralized directory to record the location and the status of data as it exists throughout the system. For example, the directory records which caches have a copy of the data, and further records if any of the caches have an updated copy of the data. When a cache makes a request to main memory for a data item, the central directory is consulted to determine where the most recent copy of that data item resides. Based on this information, the most recent copy of the data is retrieved so that it may be provided to the requesting cache. The central directory is then updated to reflect the new status for that unit of memory. A novel directory-based cache coherency system for use with multiple Instruction Processors coupled to a hierarchical cache structure is described in the co-pending application entitled "Directory-Based Cache Coherency System Supporting Multiple Instruction Processor and Input/Output Caches" referenced above and which is incorporated herein by reference in its entirety.

The use of the afore-mentioned directory-based cache coherency system provides an efficient mechanism for sharing data between multiple processors that are coupled to a distributed, hierarchical memory structure. Using such a system, the memory structure may be incrementally expanded to include any multiple levels of cache memory while still maintaining the coherency of the shared data. As the number of levels of hierarchy in the memory system is increased, however, some efficiency is lost when data requested by one cache memory in the system must be retrieved from another cache.

As an example of performance degradation associated with memory requests in a hierarchical cache memory system, consider a system having a main memory coupled to three hierarchical levels of cache memory. In the exemplary system, multiple third-level caches are coupled to the main memory, multiple second-level caches are coupled to each third-level cache, and at least one first-level cache is coupled to each second-level cache. This exemplary system includes a non-inclusive caching scheme. This means that all data stored in a first-level cache is not necessarily stored in the interconnected second-level cache, and all data stored in a second-level cache is not necessarily stored in the coupled third-level cache.

Within the above-described system, one or more processors are respectively coupled to make memory requests to an associated first-level cache. Requests for data items not resident in the first-level cache are forwarded on to the intercoupled second-level, and in some cases, the third-level caches. If neither of the intercoupled second or third level caches stores the requested data, the request is forwarded to main memory.

Assume that in the current example, a processor makes a request to the intercoupled first-level cache for a read-only copy of specified data. Assume further that the requested data is not stored in this first-level cache. However, another first-level cache within the system stores a read-only copy of the data. Since the copy of the data is read-only, the request can be completed without involving the other first-level cache. That is, the request may be processed by one of the interconnected second or third-level caches, or if neither of these caches has a copy of the data, by the main memory.

In addition to requests for read-only copies of data, requests may be made to obtain "exclusive" copies of data that can be updated by the requesting processor. In these situations, any previously cached copies of the data must be marked as invalid before the request can be granted to the requesting cache. That is, in these instances, copies of the data may not be shared among multiple caches. This is necessary so that there is only one "most-current" copy of the data existing in the system and no processor is working from outdated data. Returning to the current example, assume the request to the first-level cache is for an exclusive copy of data. This request must be passed via the cache hierarchy to the main memory. The main memory forwards this request back down the hierarchical memory structure to the first-level cache that stores the requested data. This first-level cache must invalidate its stored copy of the data, indicating that this copy may no longer be used. If this first-level cache had an exclusive copy of the data, and had further modified the data, the modified data is passed back to the main memory to be stored in the main memory and to be forwarded on to the requesting first-level cache. In this manner, the requesting cache is provided with an exclusive copy of the most recent data.

The steps outlined above with respect to the exclusive data request are similar to those that must be executed if a read-only copy of the data is requested when a copy of the requested data resides exclusively in another cache. The previous exclusive owner must forward a copy of the updated data to main memory to be returned to the requester.

As may be seen from the current example, in a hierarchical memory system having multiple levels of cache that are not all interconnected by a common bus structure, obtaining an exclusive copy of data that can be utilized by a processor for update purposes may be time-consuming. As the number of these so-called "ownership" requests for obtaining an exclusively "owned" data copy increases within the system, throughput may decrease. This is especially true as additional levels of hierarchy are included in the memory structure.

One mechanism for increasing throughput involves providing a high-speed data return path within the main memory. When data is returned from a previous owner, the high-speed interface forwards the data directly to the requester without the need to perform any type of main memory access. A high-speed interface of this type can be used to route both modified and unmodified data between the various units in the system. Such a system is described in the U.S. patent application entitled "System and Method for By-Passing Supervisory Memory Intervention for Data Transfers Between Devices Having Local Memories", Pat. No. 6,167,489, issued Dec. 26, 2000. While this type of interface decreases the time required to complete the data return operation, latency is still imposed by the length of the data return path, which extends from the lowest levels of memory hierarchy, to main memory, and back to the lowest memory levels. What is needed, therefore, is a system that minimizes the time required to return data to a requesting processor coupled to the hierarchical memory system by shortening the data return path.

Objects:

The primary object of the invention is to provide an improved shared memory system for a multiprocessor data processing system;

A further object is to provide a hierarchical, directory-based shared memory system having improved response times;

A yet further object is to provide a system for use with a hierarchical memory that transfers data up the hierarchical memory structure in anticipation of receipt of a request to provide the data to the highest level in the memory hierarchy;

Another object is to provide a system that allows modified data residing in first and second-level cache memories to be provided to an associated third-level cache memory in anticipation of the third-level cache memory receiving a request to transfer the data to a main memory;

A yet further object is to provide a system that generates speculative return requests requesting the transfer of data between first and second storage devices included within a hierarchical memory system so that an anticipated fetch operation for the data can be completed more quickly;

A still further object is to provide a hierarchical memory system that allows speculative return requests that are pending to a cache memory to be discarded after the main memory issues a request for the data that is associated with the speculative return request;

Another object is to allow a cache memory to probe one or more associated cache memories to determine the presence of updated data in anticipation of receiving a request for the data;

A still further object is to allow a first cache memory to provide requests to one or more associated cache memories requesting invalidation of predetermined data that may potentially reside within the associated cache memories in preparation for possible receipt by the first cache memory of a request for that predetermined data;

Another object is to allow a first memory to provide requests to one or more associated memories requesting that a shared copy of data potentially residing within one or more of the associated memories be provided to the first memory in preparation for possible receipt by that first memory of a request for a shared data copy;

Yet another object is to allow a first cache memory to provide requests to one or more associated cache memories requesting that an exclusive copy of data that may potentially reside within the associated cache memories be provided to the first cache memory in preparation for possible receipt by the first cache memory of a request for an exclusive data copy; and Still another object is to provide a system that allows predetermined fetch requests issued within a data processing system to generate requests to transfer the requested data between various memory resources even before it is known where the latest copy of the data resides.

SUMMARY OF THE INVENTION

The objectives of the present invention are achieved in a speculative return system that generates requests to transfer data between one or more levels within a hierarchical memory structure in anticipation of receiving a request for the data. The hierarchical memory structure includes a main memory coupled to multiple first storage devices, each of which stores data signals retrieved from the main memory. Ones of the first storage devices are further respectively coupled to second storage devices, each of which stores data signals retrieved from the respectively coupled first storage devices. In the preferred embodiment, the first and second storage devices are cache memories, and the main memory is a directory-based memory that includes a directory to indicate which of the other memories is storing a copy of addressable portions of the memory data.

According to the coherency scheme of the hierarchical memory structure, each of the first storage devices is capable of generating a fetch request to the main memory to obtain a copy of requested ones of the data signals. In some instances, the main memory does not store the latest copy of the requested data signals, as will be indicated by corresponding status signals stored in the directory memory. When this occurs, the main memory issues a return request to cause a target one of the first storage devices to return the latest copy of the requested data signals to the main memory so these signals can be forwarded to the requesting storage device. In some cases, however, the target one of the first storage devices, has, in turn, provided the requested data signals to one or more of the respectively coupled second storage devices. Additional storage devices may be further coupled to these second storage devices for storing data copies. Thus, the data signals must be transferred up the hierarchical memory structure, from the storage devices at the lowest level in the memory hierarchy to the target storage device, and finally to the main memory. This imposes latency.

The speculative return system of the current invention decreases the time required for the main memory to retrieve data signals stored in a lower level in the hierarchical memory system. The speculative return system includes at least one speculative return generation logic circuit coupled to at least two of the first storage devices. The speculative return generation logic circuit intercepts fetch requests generated by any of the coupled first storage devices. In response thereto, the speculative return generation logic circuit generates a speculative return request to one or more of the other coupled first storage devices. The speculative return request causes these first storage devices to prepare to send any stored, updated copy of the requested data signals to main memory. This includes retrieving any updated copies of the requested data signals that may be stored at a lower level in the hierarchical memory structure, including those copies stored in the respectively coupled second storage devices.

While any stored copies of the requested data signals are being retrieved in response to the speculative return request, the original fetch request is received by the main memory. In response thereto, the main memory may generate a return request to a target one of the first storage devices to return the latest copy of the requested data signals. If the target one of the first storage devices is one of the one or more storage devices that has already executed the speculative return request, the requested data signals are already resident in the target storage device upon receipt of the return request. These data signals may therefore be provided immediately by the target storage device to the main memory so they can be forwarded to the requesting storage device. This decreases memory latency.

In the current hierarchical memory system, various types of fetch requests may be generated to the main memory. According to one aspect of the speculative return generation system, a speculative return request is generated only in response to the receipt of predetermined types of fetch requests. For example, in the preferred embodiment, some fetch requests are associated with the retrieval of an exclusive data copy, whereas other fetch requests initiate the retrieval of a read-only data copy. Still other types of fetches are conditional fetches that trigger the execution of a prediction algorithm to determine whether an exclusive, versus a read-only copy, will be retrieved. The current speculative return generation system generates speculative return requests for exclusive-copy fetches and some conditional fetches. This design choice is made to minimize the unnecessary transfer of data signals within the hierarchical memory when it is likely that the read-only, shared data copy is already available from the main memory.

According to another aspect of the invention, several types of speculative return requests may be generated depending on the type of fetch request that is issued. In the preferred embodiment, a fetch request that is requesting an exclusive data copy initiates a predetermined type of speculative return request that purges any stored data copy from the lower levels in the memory. Alternatively, a fetch request requesting a shared, read-only data copy initiates a speculative return request that allows lower memory levels to retain a shared, read-only data copy while returning a read-only copy to a respective one of the first storage devices.

The current speculative return system includes logic to temporarily store speculative return requests, if necessary, prior to providing those requests to a respectively-coupled one of the first storage devices for processing in an order determined by a predetermined priority scheme. The speculative return generation system is further coupled to receive from the main memory all return requests that are generated to any of the respectively-coupled ones of the first storage devices. If a return request is received that was initiated by the same fetch request that initiated a still-pending speculative return request, the speculative return request is discarded. The speculative return request is not needed in this instance since the transfer of data from the lower to the higher levels of the memory is accomplished via execution of the return request itself In one embodiment of the invention, the first storage devices are each associated with a tag memory. This tag memory stores status signals descriptive of the data signals stored in the associated first storage device, and in additional ones of the storage devices coupled to the associated first storage device at a lower level of the memory hierarchy. These status signals describe both the location and type of any copies of the data signals residing in these storage structures. Speculative return requests issued to first storage devices initiate the return of data signals from lower levels in the memory hierarchy only if the status signals in the tag memory indicate that a predetermined type of data copy exists for the requested data signals. In the preferred embodiment, this data transfer occurs only if an exclusive, read/write copy of the data signals is resident in the lower memory levels. This design choice is made to optimize memory efficiency.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF DESCRIPTION OF THE FIGURES

The present invention will be described with reference to the accompanying drawings.

FIG. 7 is a block diagram illustrating the format of requests as provided by the TCM to the MSU;

FIG. 8 is a block diagram illustrating the format of requests provided by the MSU to the TCM;

FIG. 9 is a table summarizing the types of Speculative Return Functions that are generated by the TCM in response to receiving various ones of the Fetch commands from a Sub-POD.

DETAILED DESCRIPTION OF THE PREFERRED EMBODIMENTS

Figure 1:
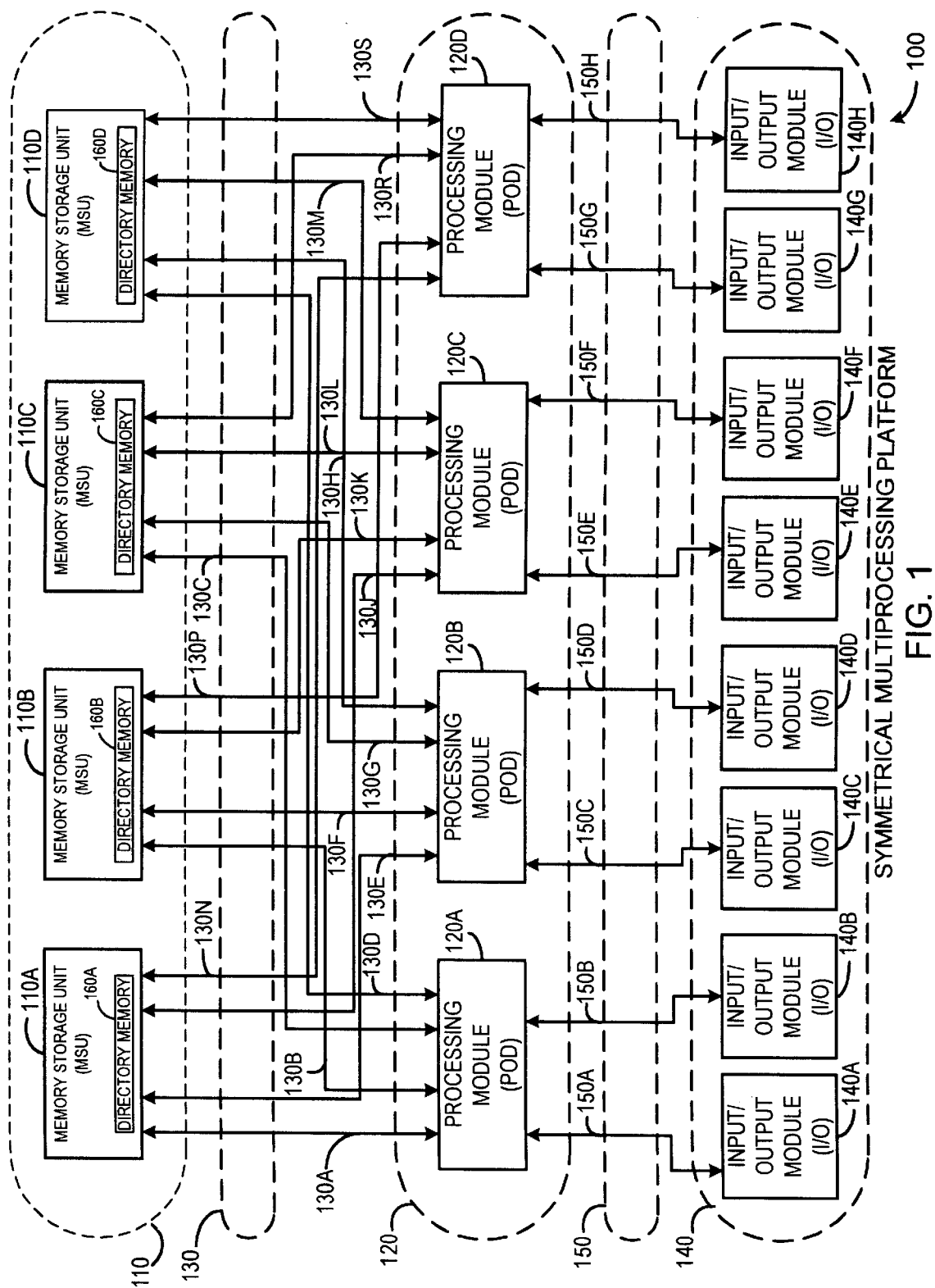
FIG. 1 is a block diagram of a Symmetrical MultiProcessor (SMP) system platform according to a preferred embodiment of the present invention.

System Platform:

FIG. 1 is a block diagram of a Symmetrical Multi-Processor (SMP) System Platform according to a preferred embodiment of the present invention. System Platform 100 includes one or more Memory Storage Units (MSUs) in dashed block 110 individually shown as MSU 110A, MSU 110B, MSU 11C and MSU 101D, and one or more Processing Modules (PODs) in dashed block 120 individually shown as POD 120A, POD 120B, POD 120C, and POD 120D. Each unit in MSU 110 is interfaced to all PODs 120A, 120B, 120C, and 120D via a dedicated, point-to-point connection referred to as an MSU Interface (MI) in dashed block 130, individually shown as 130A through 130S. For example, MI 130A interfaces POD 120A to MSU 110A, MI 130B interfaces POD 120A to MSU 110B, MI 130C interfaces POD 120A to MSU 110C, MI 130D interfaces POD 120A to MSU 110D, and so on.

In one embodiment of the present invention, MI 130 comprises separate bi-directional data and bi-directional address/command interconnections, and further includes unidirectional control lines that control the operation on the data and address/command interconnections (not individually shown). The control lines run at system clock frequency (SYSCLK) while the data bus runs source synchronous at two times the system clock frequency (2×SYSCLK).

Any POD 120 has direct access to data in any MSU 110 via one of MIs 130. For example, MI 130A allows POD 120A direct access to MSU 110A and MI 130F allows POD 120B direct access to MSU 110B. PODs 120 and MSUs 110 are discussed in further detail below.

System Platform 100 further comprises Input/Output (I/O) Modules in dashed block 140 individually shown as I/O Modules 140A through 140H, which provide the interface between various Input/Output devices and one of the PODs 120. Each I/O Module 140 is connected to one of the PODs across a dedicated point-to-point connection called the MIO Interface in dashed block 150 individually shown as 150A through 150H. For example, I/O Module 140A is connected to POD 120A via a dedicated point-to-point MIO Interface 150A. The MIO Interfaces 150 are similar to the MI Interfaces 130, but in the preferred embodiment have a transfer rate that is approximately half the transfer rate of the MI Interfaces because the I/O Modules 140 are located at a greater distance from the PODs 120 than are the MSUs 110.

Figure 2:
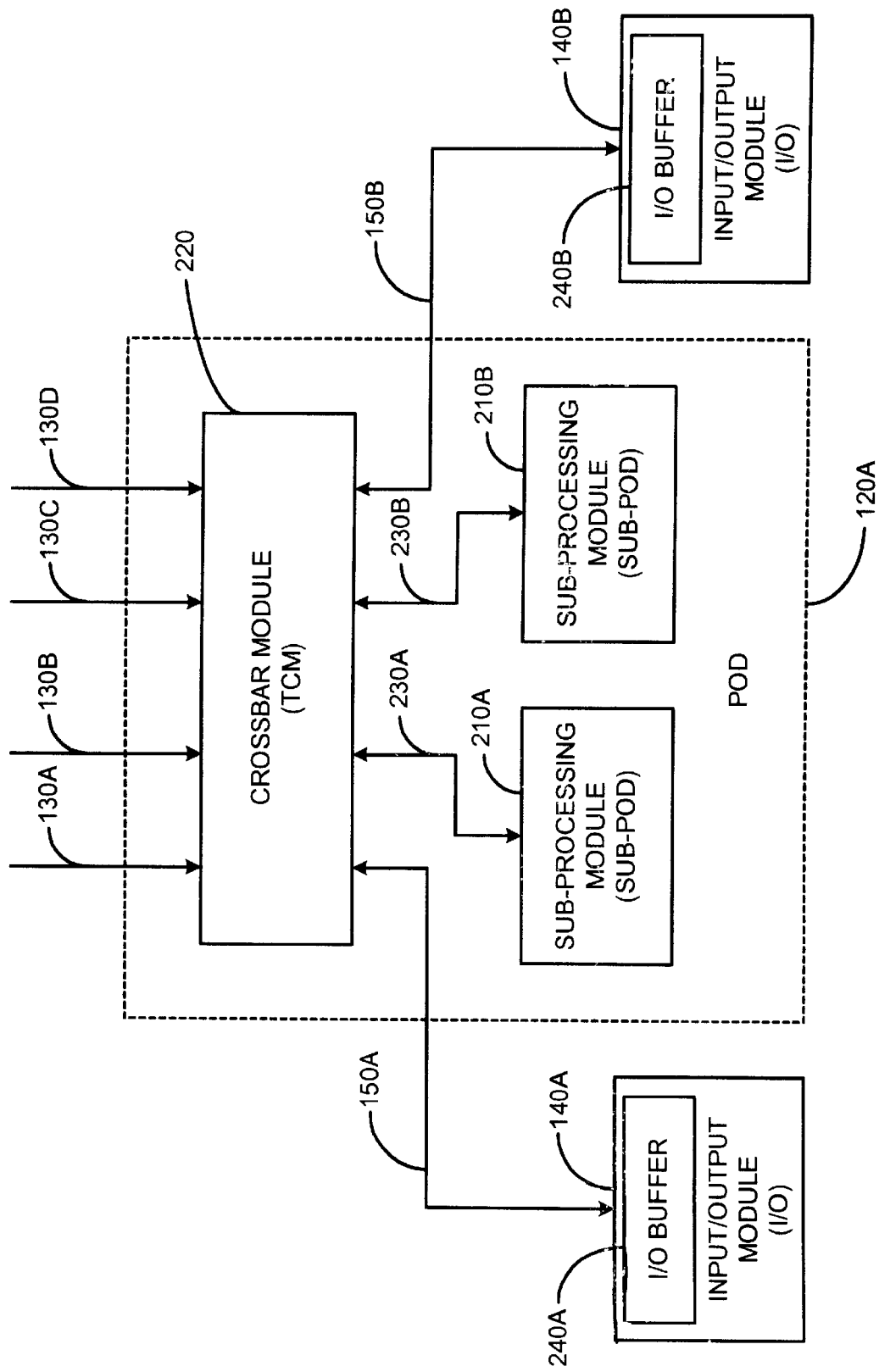
FIG. 2 is a block diagram of a Processing Module.

Processing Module (POD):

FIG. 2 is a block diagram of a processing module (POD) according to one embodiment of the present invention. POD 120A is shown, but each of the PODs 120A through 120D have a similar configuration. POD 120A includes two Sub-Processing Modules (Sub-PODs) 210A and 210B. Each of the Sub-PODs 210A and 210B are interconnected to a Crossbar Module (TCM) 220 through dedicated point-to-point Sub-POD Interfaces 230A and 230B, respectively, that are similar to the MI interconnections 130. TCM 220 further interconnects to one or more I/O Modules 140 via the respective point-to-point MIO Interfaces 150. TCM 220 both buffers data and functions as a switch between the Sub-POD Interfaces 230A and 230B, the MIO Interfaces 150A and 150B, and the MI Interfaces 130A through 130D. When an I/O Module 140 or a Sub-POD 210 is interconnected to one of the MSUs via the TCM 220, the MSU connection is determined by the address provided by the I/O Module or the Sub-POD, respectively. In general, the TCM maps one-fourth of the memory address space to each of the MSUs 110A–110D. According to one embodiment of the current system platform, the TCM 220 can further be configured to perform address interleaving functions to the various MSUs. The TCM may also be utilized to perform address translation functions that are necessary for ensuring that each processor (not shown in FIG. 2) within each of the Sub-PODs 210 and each I/O Module 140 views memory as existing within a contiguous address space as is required by certain off-the-shelf operating systems.

Figure 3:
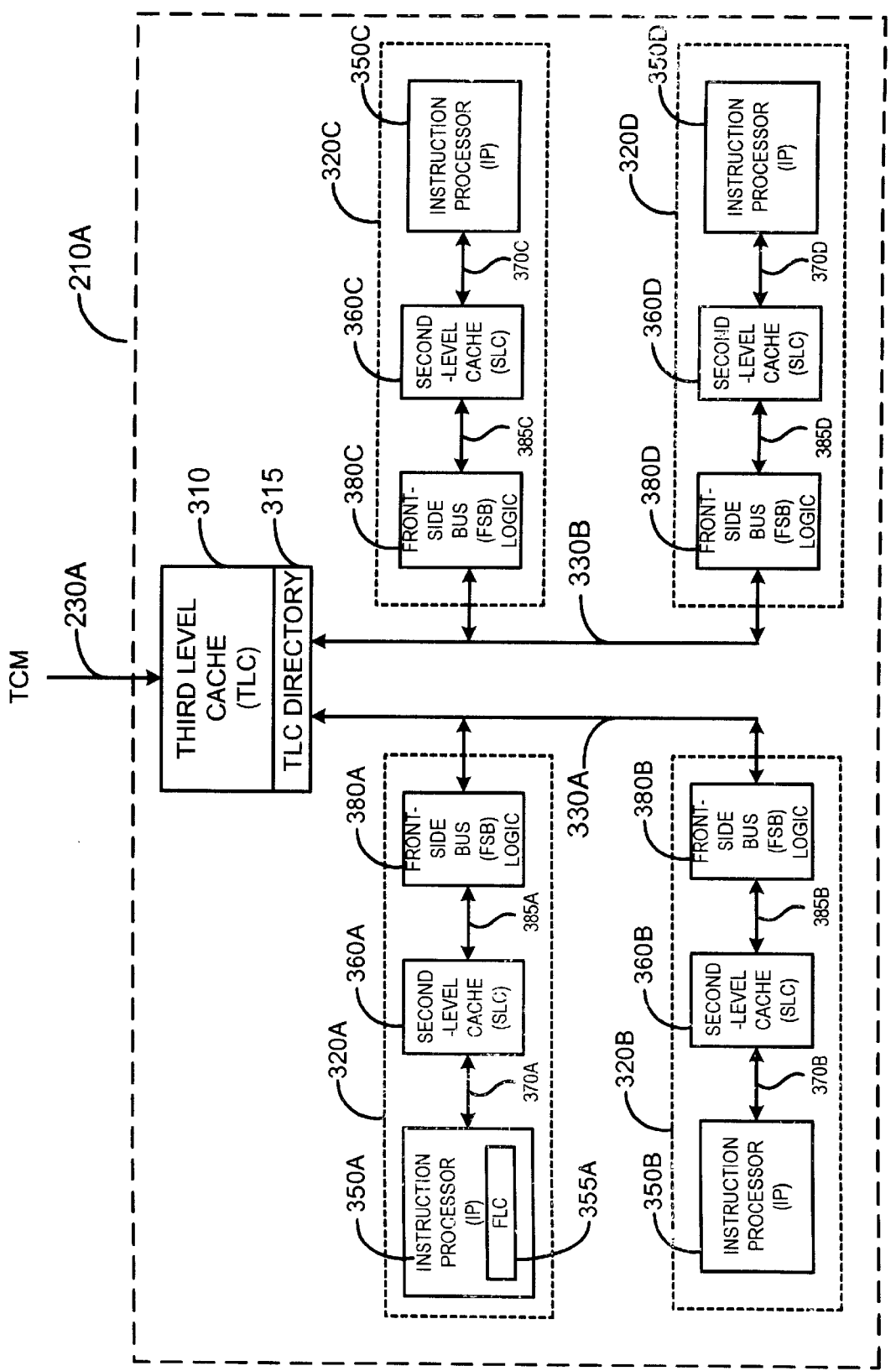
FIG. 3 is a block diagram of the Sub-Processing Module.

In one embodiment of the present invention, I/O Modules 140 are external to Sub-POD 210 as shown in FIG. 2. This embodiment allows System Platform 100 to be configured based on the number of I/O devices used in a particular application. In another embodiment of the present invention, one or more I/O Modules 140 are incorporated into Sub-POD 210. Each of the I/O Modules includes a local memory shown as I/O Buffers 240A and 240B of FIG. 2. These I/O Buffers could be buffer memories, or could be cache memories including tag and coherency logic as is known in the art.
Sub-Processing Module:

FIG. 3 is a block diagram of a Sub-Processing Module (Sub-POD). Sub-POD 210A is shown, but it is understood that all Sub-PODs 210 have similar structures and interconnections. In this embodiment, Sub-POD 210A includes a Third-Level Cache (TLC) 310 and one or more Coherency Domains 320 (shown as Coherency Domains 320A, 320B, 320C, and 320D). TLC 310 is connected to Coherency Domains 320A and 320B via Bus 330A, and is connected to Coherency Domains 320C and 320D via Bus 330B. TLC 310 caches data from the MSU, and maintains data coherency among all of Coherency Domains 320, guaranteeing that each processor is always operating on the latest copy of the data.

Each Coherency Domain 320 includes an Instruction Processor (IP) 350 (shown as IPs 350A, 350B, 350C, and 350D). Each of the IPs includes a respective First-Level Cache (FLC). An exemplary FLC 355A is shown for IP 350A. Each of the IPs is coupled to a Second-Level Cache (SLC) 360 (shown as SLC 360A, 360B, 360C and 360D) via a respective point-to-point Interface 370 (shown as Interfaces 370A, 370B, 370C, and 370D). Each SLC further interfaces to Front-Side Bus (FSB) Logic 380 (shown as FSB Logic 380A, 380B, 380C, and 380D) via a respective one of Interfaces 385A, 385B, 385C, and 385D. FSB Logic is also coupled to a respective one of Buses 330A or 330B.

In the preferred embodiment, the SLCs 360 operate at a different clock speed than Buses 330A and 330B. Moreover, the request and response protocols used by the SLCs 360 are not the same as those employed by Buses 330A and 330B. Therefore, FSB logic is needed to translate the SLC requests into a format and clock speed that is compatible with that used by Buses 330.

Directory-Based Data Coherency Scheme of the System Architecture:

Before discussing the speculative return of cached data in more detail, the data coherency scheme of the current system is discussed. Data coherency involves ensuring that each processor within Platform 100 operates on the latest copy of the data, wherein the term "data" in the context of the current Application refers to both processor instructions, and any other types of information such as operands stored within memory. Since multiple copies of the same data may exist within platform memory, including the copy in the MSU 110 and additional copies in various local cache memories (local copies), some scheme is needed to control which data copy is considered the "latest" copy.

The platform of the current invention uses a directory protocol to maintain data coherency. In a directory protocol, status information is associated with units of data stored within the main memory. In the preferred embodiment, status information is stored in Directory Memories 160A, 160B, 160C, and 160D of FIG. 1 for each 64-byte segment of data, or "cache line", residing within the MSUs 110. For example, the status information describing a cache line of data stored in MSU 110A is stored in Directory Memory 160A, and so on. Status information is monitored and updated by a controller when a copy of a cache line is requested by one of the Sub-PODs 210 so that the Directory Memories record which Sub-PODs 210 or I/O Modules 140 have copies of each cache line in the system. The status also includes information on the type of copies that reside within the system, as is discussed below.

In the present invention, a cache line copy may be one of several types. Copies residing within caches in the Sub-PODs may be either "shared" or "exclusive" copies. If a cache line is shared, one or more Sub-PODs may store a local copy of the cache line for read-only purposes. A Sub-POD having shared access to a cache line may not update the cache line. Thus, for example, Sub-PODs 210A and 210B may have shared access to a cache line such that a copy of the cache line exists in the Third-Level Caches 310 of both Sub-PODs for read-only purposes.

In contrast to shared status, exclusive status, which is also referred to as "exclusive ownership", may be granted to only one Sub-POD at a time for any given cache line. When a Sub-POD has exclusive ownership of a cache line, no other Sub-POD may have a copy of that cache line in any of its associated caches. A cache line is said to be "owned" by the Sub-POD that has gained the exclusive ownership.

A Sub-POD is provided with a copy of a cache line after the Sub-POD makes a fetch request on Sub-POD Interface 230A to the TCM220. The TCM responds by providing a fetch request to the appropriate MSU 110 based on the cache line address. The type of fetch request made to memory is determined by the type of cache line copy that is requested by the Sub-POD.

A. Fetch Copy Requests

When a Sub-POD requests a read-only copy of a cache line, the TCM responds by issuing a "Fetch Copy" command to the addressed one of MSUs 110A–110D on the command lines of the corresponding MSU Interface (MI) 130. At the same time, the cache line address is asserted on the MI address lines. The MSU receiving this request consults its Directory Memory 160 to determine the current status of the requested cache line. If the MSU stores the most recent copy of the cache line as indicated by a cache line status of "Present", the MSU can provide the cache line data accompanied by a response indication directly to the requesting Sub-POD 210 via the TCM on MI 130. The response indication is encoded on unidirectional, MSU-to-TCM control lines included within each of the MIs 130.

The MSU may not have the most recent copy of the cache line because another Sub-POD is the exclusive owner of the data. In this instance, the MSU must request that this owner Sub-POD return any updated data to the MSU. To accomplish this, the MSU issues a "Return Function" to the owner Sub-POD via the associated TCM 220A. The Return Function is encoded on the command lines of the MI 130, along with the address of the requested cache line. This Function is received by the associated TCM and forwarded to the target Sub-POD.

Several types of Return Functions exist. In the current example, the requesting Sub-POD is requesting a read-only, shared copy of the cache line. This means that although the owner Sub-POD must provide any cache line updates to the MSU so these updates can be provided to the requesting Sub-POD, the owner Sub-POD may also keep a read-only copy of this cache line. To communicate this, the MSU issues a special Return Function called a "Return Keep Copy". The TCM responds by returning the requested cache line on the data lines of the MI 130, and by further asserting a "Return Command" on the MI command lines. If this Sub-POD retains a read-only copy of the cache line, that Sub-POD is no longer considered the "owner", since no write operations may be performed to the cache line. Thus, the Sub-POD is said to return both data and ownership to the MSU with the Return Command.

After data is returned from the Sub-POD, a special POD-to-POD interface within the MSU routes the data from the returning MI 130 to the MI associated with the requesting unit. This POD-to-POD interface is described in the above-referenced application entitled "System and Method for By-Passing Supervisory Memory Intervention for Data Transfers Between Devices Having Local Memories". It may be noted that data is routed in this manner even if the previous owner did not modify the cache line. Providing unmodified returned data in this manner is more expedient then reading the cache line from the MSU. The returned data need only be written back to the MSU if the cache line was actually modified as is indicated by the type of Return Command issued by the Sub-POD. A Sub-POD issues a "Return Block" command to indicate the presence of a modified cache line, whereas a "Return Fast" command is issued to indicate the return of an unmodified cache line. In either instance, the MSU Directory Memory 160 is updated to reflect the new cache line status.

B. Fetch Original Requests

In a manner similar to that discussed above with regards to read-only cache line copies, a Sub-POD gains exclusive ownership of a cache line by making a "Fetch Original" fetch request to the MSU via the TCM 220, which encodes the request on the command lines of the MI 130. In response, the MSU may provide the cache line directly if the cache line is "Present" in the MSU such that no other Sub-POD has a copy of the cache line.

When a Sub-POD makes a request to gain exclusive ownership of a cache line, and the cache line is stored within another Sub-POD in the system, the request is handled in one of several ways. If another Sub-POD has exclusive ownership of the cache line, the MSU issues a Return Function to the owner Sub-POD requesting the return of the cache line data in the manner discussed above. In this instance, a "Return Purge" function is issued to indicate that the previous Sub-POD owner may not keep a copy of the cache line, but instead must purge it from all cache memories. This is necessary since only one Sub-POD may have exclusive ownership of a cache line at one time.

Upon receipt of the Return Purge function, the Sub-POD determines whether the cache line has been modified. If so, the Sub-POD returns both the data and ownership to the MSU by directing the corresponding TCM 220 to issue a Return Command on the MI 130. Alternatively, if the owner Sub-POD has not modified the cache line, the Sub-POD returns just the ownership to the MSU using a "Return Fast" command in the manner discussed above. In this instance, the owner Sub-POD may not keep a copy of the cache line for any purpose, and the cache line is marked as invalid in the local cache.

The MSU responds to the Return Commands by providing the most recent cache line data, along with exclusive ownership, to the requesting Sub-POD via the associated TCM. The MSU provides this response by encoding an acknowledgment on the command lines of the MI along with the data provided on the MI data lines. Additionally, the MSU updates the corresponding Directory Memory 160 with the cache line status indicating the new Sub-POD owner, and stores any returned data.

The above description relates to the return of data when a requested cache line is exclusively owned by another Sub-POD. According to another scenario, the cache line may reside as a read-only, shared copy within a cache of one or more Sub-PODs. In this instance, the MSU issues a "Purge Function" to these Sub-PODs such that all local copies are invalidated and can no longer be used. The MSU then provides the cache line and ownership to the requesting Sub-POD and updates the Directory Memory status in the manner discussed above.

C. Fetch Conditional Requests

In instances in which the Sub-POD is requesting an operand, the TCM issues a "Fetch Conditional" command to the addressed MSU 110. Upon receipt of this command, the MSU consults the state of the cache line in Directory Memory 160. If the cache line data must be retrieved from another Sub-POD, an optimization algorithm is used by the MSU to determine whether a "Return Keep Copy" or a "Return Purge" is issued to the Sub-POD. In other words, the algorithm determines whether an exclusive or shared copy of the cache line will be provided to the requesting Sub-POD. The algorithm, which is largely beyond the scope of the current invention, is based on the current cache line state, and is designed to optimize the sharing of operand data, whenever possible, so that performance is enhanced. After the selected Return function is issued by the MSU to the owner Sub-POD, Fetch Conditional Requests are handled in the manner discussed above with respect to other Fetch requests.

D. Flush Operations

In addition to returning cache line data to the MSU 110 following the receipt of a Return Function, Sub-PODs may also provide data to the MSU in other situations. For example, a Sub-POD may provide data to be written back to an MSU during Flush operations. When a Sub-POD receives a cache line from an MSU, and the cache line is to be copied to a cache that is already full, space must be allocated in the cache for the new data. Therefore, a predetermined algorithm is used to determine which older cache line(s) will be disposed of, or "aged out of", cache to provide the amount of space needed for the new information. If the older data has never been modified, it may be merely overwritten with the new data. However, if the older data has been modified, the cache line including this older data must be written back to the MSU 110 during a Flush Operation so that this latest copy of the data is preserved.

F. I/O Operations

As discussed above, cache lines residing within a Sub-POD will have either a shared or exclusive status. Other types of status indications are used when a cache line resides within an I/O Buffer 240 of an I/O Module 140. For example, a status of "I/O Copy" is used to describe a read-only copy of a cache line stored within an I/O Buffer 240. In a manner similar to that described above for shared cache lines, a cache line in the I/O Copy state may not be modified. Unlike a cache line having a status of "shared", a cache line in the I/O Copy state may only be stored in one I/O Buffer at a time. No other TLC or I/O Module may have a copy of any kind, shared or exclusive, while an I/O Module has an I/O Copy of a cache line.

I/O Buffers 240 may also store exclusive copies of cache lines. Such cache lines are said to have a status set to "I/O Exclusive". Both read and write operations may be performed to a cache line that is exclusively owned within an I/O Buffer. Unlike cache lines that are exclusively owned by a Sub-POD (that is, have a status of "exclusive"), a cache line that is exclusively owned by an I/O Buffer will remain in the I/O Buffer until the I/O Module flushes the data back to the MSU without prompting. The MSU will not initiate a Return operation when the cache line is in this state, and any requests for the cache line will remain pending until the I/O Module performs a flush operation.

Finally, as indicated above, a cache line may have a status of "Present". This status is assigned to the cache line when the MSU has the most current copy of the data and no other Sub-PODs or I/O Modules have a valid local copy of the data. This could occur, for example, after a Sub-POD or I/O Module having an exclusive copy of the cache line performs a Flush operation so that the MSU thereafter has the only valid copy of the data. This status indication is also assigned to a cache line after an I/O Module initially stores that cache line in the MSU during what is referred to as an "I/O Overwrite" operation. An I/O Overwrite is performed whether or not any other Sub-PODs or I/O Modules have local copies of the overwritten cache line. The MSU issues a Purge function to these Sub-PODs or I/O Modules so that the outdated data is invalidated.

Coherency Scheme within a Sub-POD:

As discussed above, in the system of the preferred embodiment, directory information is stored in Directory Memories 160 in the MSU to record which of the Sub-POD (s) or I/O Modules store particular cache lines. The MSU directory does not, however, indicate which of the cache memories within a Sub-POD has a copy of the cache line. For example, within a Sub-POD, a given cache line may reside within the TLC 310, one or more SLCs 360, and/or one or more First-Level Caches of a Sub-POD IP. Information pertaining to the specific cached data copies is stored in a directory memory within the TLC.

In a manner similar to that described above with respect to the MSU, the TLC stores status information about each cache line in TLC Directory 315 of FIG. 3. This status information indicates whether the TLC was granted either exclusive ownership or a read copy of a particular cache line by the MSU 110. The status information also indicates whether the TLC has, in turn, granted access to one or more SLCs in the respective Sub-POD. If the TLC has exclusive ownership, the TLC may grant exclusive ownership to one of the SLCs 360 in a Sub-POD 210 so that the IP 350 coupled to the SLC may update the cache line. Alternatively, a TLC having exclusive ownership of a cache line may also grant a read copy of the cache line to multiple ones of the SLCs in a Sub-POD. If the TLC only has a read copy of a cache line, the TLC may grant a read copy to one or more of the SLCs 360 in a Sub-POD 210 such that the interconnected IP may read, but not write, the cache line. In this case, the TLC may not grant any of the SLCs write access to the cache line.

The TLC tracks the copies that exist within a Sub-POD by recording an indicator identifying one or both of the Buses 330 to which it is coupled. For example, if TLC 310 granted exclusive ownership of a cache line to SLC 360A, the indicator stored in the TLC directory for that cache line identifies Bus 330A as having exclusive ownership. If TLC 310 granted read copies to both SLCs 360A and 360C, the TLC directory identifies both Buses 330A and 330B as having read copies.

When data is provided to an SLC 360, it may also be provided to the respective First-Level Cache (FLC) within the IP 350 coupled to that SLC. Generally, whenever an IP requests a read copy of data, the read copy will be provided by the SLC to be stored within the IP's FLC. An exception to this rule occurs for certain system-level clock information that will become outdated, and therefore is not forwarded to the FLC. In contrast to read data, a cache line that is obtained by the SLC from the TLC on an exclusive ownership basis is not generally forwarded to the FLC for storage. An exception to this rule occurs for certain resources that are associated with software locks, and which must be cached within the FLC until the IP releases the lock. The SLC includes Tag RAM Logic (not shown in FIG. 3) to record whether the associated FLC stores a copy of a particular cache line, and which is largely beyond the scope of this invention.

As discussed above, the directory status information stored within the MSU 110 is used to maintain data coherency throughout the entire system. In a similar manner, the directory status information within the TLC is used to maintain data coherency within the respective Sub-POD 210. Within the Sub-POD, data coherency is maintained for each of the Buses 330, and is also maintained for the Sub-POD as a whole.

Data coherency is maintained for each of the Buses 330 using a snooping mechanism. If an IP 350 makes a request for an address that is not present in either the respective FLC or SLC, the SLC initiates a request via the respective FSB Logic 380 to the associated Bus 330. The request will indicate the type of request (read or write), and will also indicate the request address. Each SLC monitors, or "snoops" the Bus 330 via its respective FSB logic for these types of requests from the other SLC on Bus 330. When such a request is detected, the SLC that detected the request checks its internal Tag RAM to determine whether it stores a modified copy of the requested data. If it does store a modified copy of the requested data, that data is provided on Bus 330 so that a copy can be made within the requesting SLC. Additionally, if the requesting SLC is requesting exclusive ownership of the data, the other (non-requesting) SLC must also mark its resident copy as invalid, since only one SLC may have write ownership at a given time. Furthermore, if the SLC detecting the request determines that its associated FLC also stores a copy of the cache line that is requested for exclusive ownership, that SLC must direct the FLC to invalidate its local copy.

If an SLC is requesting a cache line that has not been modified by the other SLC that resides on the same Bus 330, the TLC 310 will handle the request. In this case, the SLC presents the request to Bus 330, and because the associated SLC does not respond to the request in a pre-determined period of time with snoop results, the TLC handles the request.

A TLC 310 processes requests from the SLCs in the associated Sub-POD by determining if that Sub-POD has been granted the type of access that is being requested, and if so, by then determining how the requested cache line may be obtained. For example, a TLC may not grant exclusive ownership of a cache line to an SLC if the TLC itself has not been granted exclusive ownership. If the TLC has been granted exclusive ownership, the TLC must further determine if the other (non-requesting) Bus 330 has, in turn, been granted exclusive ownership. If the other Bus 330 has exclusive ownership of the data, the TLC issues a request to that Bus to initiate return of the data. Because the SLCs are snooping the Bus, this request will be detected, and an SLC owning the data will return any modified copy of the data to the TLC. Additionally, any copies of the requested cache line residing within the caches of the previous owner SLC will be marked as invalid. The TLC may then provide the data to the requesting SLC and update its directory information to indicate that the other Bus 330 now has the exclusive ownership.

A similar mechanism is used if the SLC is requesting read access. If the TLC has been granted read access by the MSU for the requested cache line, the data is provided to the requesting SLC and the directory information is updated to reflect that the associated Bus 330 has read access of the data. Both Buses may be granted read access to the cache line simultaneously.

In yet another scenario, the TLC may not have a copy of the requested cache line at all, or may not have the type of access that is requested. This could occur for a number of reasons. For example, A TLC may obtain a copy of a cache line from the MSU, provide it to one or more of the SLCs in its Sub-POD, then later age the cache line out of memory to make room for another cache line. This aging out of the cache line in the TLC may occur even though an SLC in the Sub-POD still retains a copy. This is allowed because the cache memories of the preferred embodiment are not inclusive caches. That is, each cache line residing within an SLC does not necessarily reside in the associated TLC 310. As a result of this non-inclusive cache configuration, a request by any of the SLCs in the Sub-POD for the cache line may result in a cache miss at the TLC even if the cache line is stored in another SLC within the same Sub-POD. A cache miss could also occur because the requested cache line does not reside in the TLC or in any other one of the caches in the respective Sub-POD. In yet another instance, an SLC may be requesting exclusive ownership of a cache line, but the associated TLC has only been granted a read copy of a requested cache line. In any of these cases, the TLC must make a request for the cache line via the associated Sub-POD Interface 230 to the TCM 220, which then issues an appropriate fetch request on the MI 130 to the addressed MSU 110 as described above.

After a TCM makes a request via the respective MI Interface for access to a cache line, the request is presented to MSU 110, and the directory logic within the MSU determines where the most current copy of the data resides. This is accomplished in the manner discussed above. If the MSU owns the most recent copy of the data, the data may be provided immediately to the requesting TLC with the requested permission as either a read copy or with exclusive ownership. Similarly, if only a read copy of the data is being requested, and the MSU has granted only read copies to other Sub-PODs 210, the MSU may immediately provide the additional read copy to the requesting TLC. However, if exclusive ownership is being requesting, and the MSU has already granted exclusive ownership to another Sub-POD, the MSU must initiate a Return operation so that the TLC currently owning the data returns any updated data. These MSU requests may take a substantial amount of time, especially if a large number of requests are already queued to use the MI 130 associated with Sub-PODs having current copies of the requested cache line.

From the above discussion, it is apparent that a Return Operation can require a substantial amount of time to complete. The TLC 310 or I/O Module 140 must make a request to the associated TCM, which must then gain access to the appropriate MI. The request is processed by the MSU, which must then provide a Return function to the appropriate POD. The TCM within the POD must route the request to a Sub-POD, and the Sub-POD TLC must obtain a copy of the cache line from an associated SLC. Finally, the cache line must be returned from the TLC to the TCM, forwarded to the MSU, and finally passed to the requesting unit. Some latency is imposed by these operations. However, the latency may be significantly reduced if a cache line is already resident within the TLC when a Return function arrives from the TCM. The current invention provides a system for performing speculative data returns to the TLC so that this objective can be accomplished.

Description of the Speculative Return System:

The current invention provides a system and method for causing the TCM 220 to issue requests to a TLC 310 that initiate bus probe operations of Buses 330 for a predetermined cache line. The bus probe operations result in the return of the cache line data to the TLC so that data is ready to be provided to the TCM in the event the TCM receives a Return function from an MSU 110 requesting the cache line.

Figure 4:
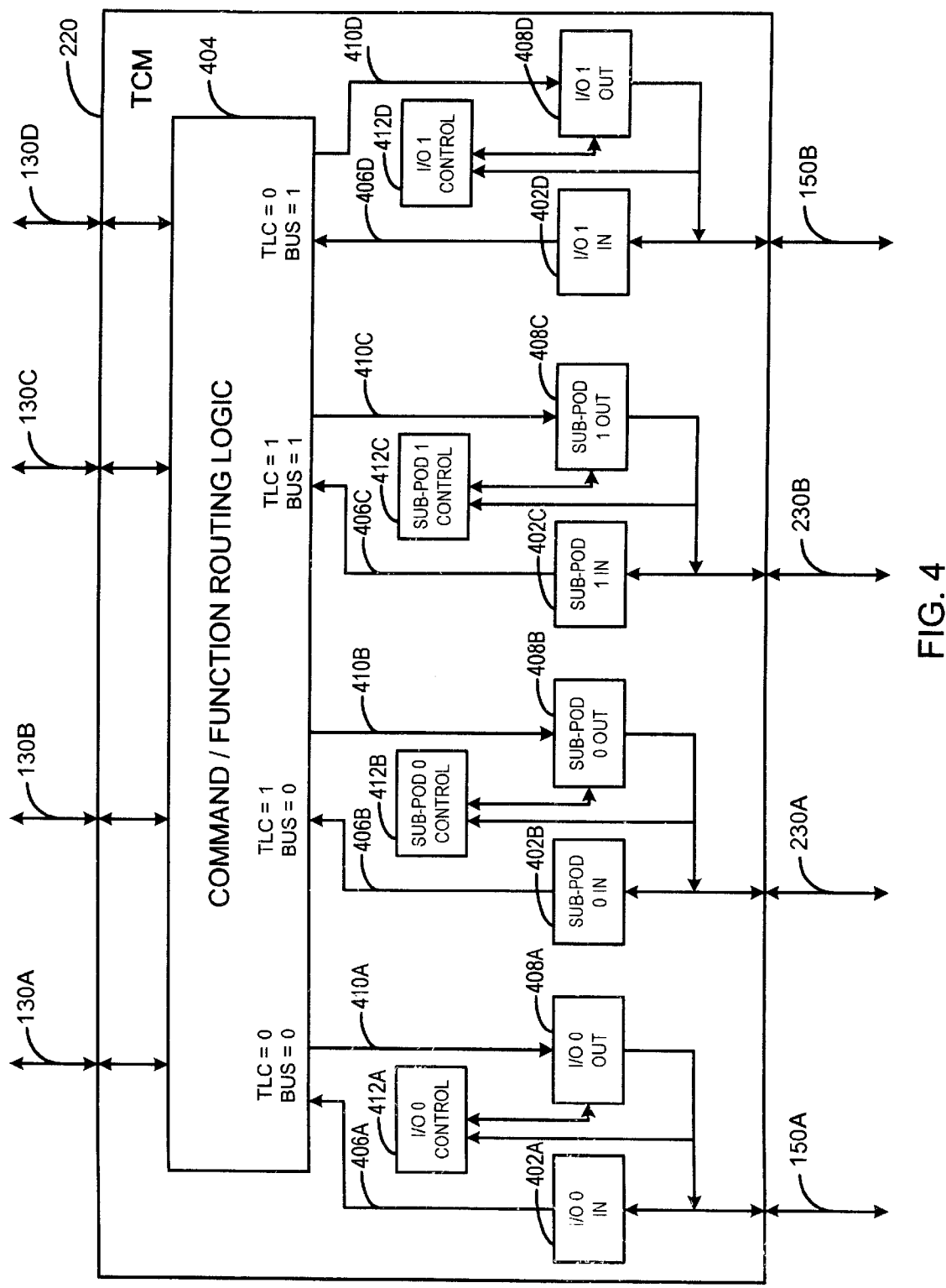
FIG. 4 is a block diagram of the TCM of the preferred embodiment.

FIG. 4 is a block diagram of the TCM of the preferred embodiment. The TCM receives requests from Sub-POD 210A and 210B on Sub-POD Interfaces 230A and 230B, respectively. TCM further receives requests from I/O Modules 140A and 140B via MIO Interfaces 150A and 150B, respectively. Each of these four interfaces is associated with a storage device for temporarily storing requests received from the respective interface. These storage devices are shown as I/O 0 IN 402A, Sub-POD 0 IN 402B, Sub-POD 1 IN 402C, and I/O 1 IN 402 D. The requests stored in these storage devices are received by Command/Function Routing Logic 404 on Input Interfaces shown as 406A, 406B, 406C, and 406D, and are processed according to a predetermined priority scheme.

Requests received from the I/O Modules 140 and Sub-PODs 210 include the address of a cache line associated with the request, and an indication of the request type. As discussed above, the request types include Fetches, Returns, Flushes, and I/O Overwrites. Each of the requests is further associated with a Job Number indication, which in the preferred embodiment is a 4-bit encoded value assigned to the request by the requesting unit. Any acknowledgement or response associated with a request will return this Job Number so that the request can be associated with the response. This is necessary since responses are not necessarily returned to a requesting unit in the order the requests are issued. Finally, the TCM appends a TLC and a Bus indication to each request before it is provided to the MSU. In the preferred embodiment, the TLC indication is set to "1" for a TLC, and is set to "0" for an I/O Module. The Bus indication is used to identify between the two TLCs and two I/O Modules associated with the same Sub-POD 210. Exemplary setting of the TLC and Bus indications are illustrated for the four Input Interfaces 406 of Command/Function Routing Logic 404.

Command/Function Routing Logic 404 translates the requests provided by the I/O Modules and Sub-PODs to a format that is compatible with the MIs 130, and routes the translated requests to the appropriate one of the MI based on the request address. As mentioned above, each MI services a respective MSU 110, with each MSU providing storage for one-fourth of the memory address space of Platform 100.

In addition to routing requests received from the I/O Modules and Sub-PODs to the addressed MSUs, the TCM also routes functions received from the MSUs via MIs 130 to the appropriate Sub-POD or I/O Module. As discussed above, these functions initiate various Return and Purge operations so that memory coherency is maintained in Platform 100. When a function is received on one of the MIs, it is stored in Command/Function Routing Logic 404, and is eventually handled according to a predetermined priority scheme. When selected for processing, it will be translated to the format required by the I/O Modules and Sub-PODs, and routed to the appropriate one of the output storage devices associated with either an MIO Interface 150 or a Sub-POD Interface 230. These storage devices are shown as I/O 0 OUT 408A, Sub-POD 0 OUT 408B, Sub-POD 1 OUT 408C, and I/O 1 OUT 408D. These devices interface to Command/Function Routing Logic via Output Interfaces 410A, 410B, 410C, and 410D, respectively. The functions stored in the output storage devices are provided to corresponding I/O Module or Sub-POD as controlled by the respective control logic shown as I/O 0 Control 412A, Sub-POD 0 Control 412B, Sub-POD 1 Control 412C, and I/O 1 Control 412D. The control logic uses control lines included in the respective MIO or Sub-POD Interface to determine when the transfer of the function to the I/O Module or Sub-POD may occur.

Finally, according to the current Speculative Return system, Command/Function Routing Logic 404 also generates functions referred to as "Speculative Returns" that are provided to predetermined Sub-PODs to initiate the return of data from an SLC 360 to a TLC 310. According to one embodiment of the invention, these functions are issued by the TCM to one of the Sub-PODs 210 in a POD 120 when the TCM receives certain types of Fetch commands from the other Sub-POD in that same POD 120. In a manner to be discussed further below, the Speculative Return operation is performed to ensure that a requested cache line will be resident in the TLC if a Return command is issued by the MSU to the corresponding Sub-POD.

Figure 5:
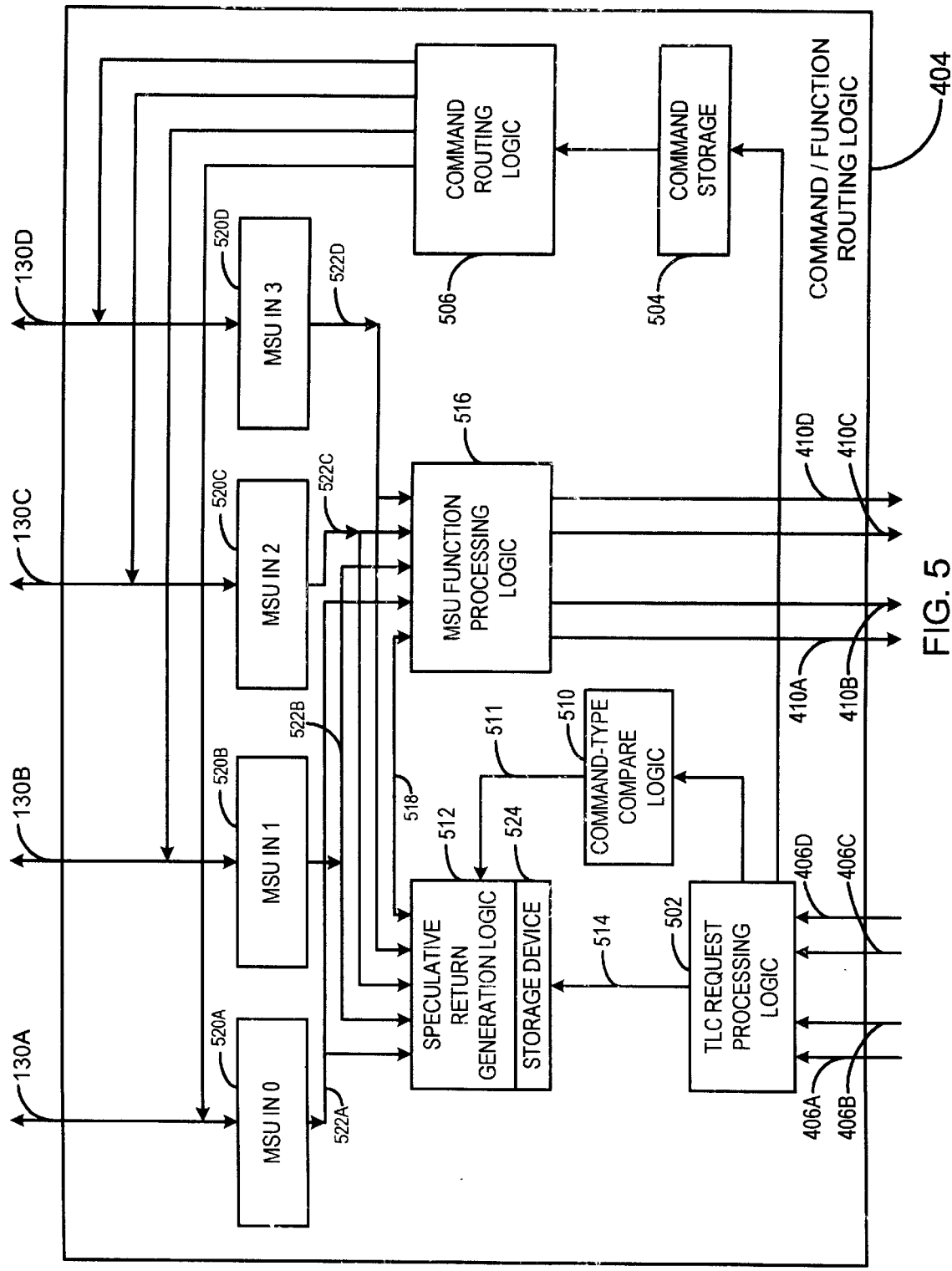
FIG. 5 is a block diagram of Command/Function Routing Logic.

FIG. 5 is a block diagram of Command/Function Routing Logic 404. TLC Request Processing Logic 502 processes requests stored in the Input Storage Devices 402A–402D according to a predetermined priority scheme. Requests are translated into the format required by MIs 130, the Bus and TLC indications are appended to the requests in the manner discussed above, and the request data is stored in Command Storage 504 until each request can be transferred to the respectively addressed one of the MSUs. When an addressed one of the MIs 130 is available for use as indicated by control lines associated with the MI, Command Routing Logic 506 retrieves a corresponding request from Command Storage 504 and routes the request to the appropriate MI 130 based on the address of the cache line.

Requests received by an MSU from MIs 130A–130D are processed according to a predetermined priority scheme. As discussed above, the manner in which a request is processed by the MSU depends on the command type included in the request, and the status of the requested cache line as indicated by the Directory Memory 160. In the current example, it will be assumed that MSU 110A is processing a Fetch Original command received from Sub-POD 210A of POD 120A, and the Directory Memory indicates the requested cache line is exclusively owned by Sub-POD 210B of POD 120A. As a result, MSU 130 builds a request including a "Return Purge" function. This request will be provided to TCM 220 of POD 120A to initiate the return of data from TLC 310 of Sub-POD 210A. The format of this request is discussed further below.

While the Fetch Original request of the current example is being provided to the MSU to be processed in the manner discussed above, a corresponding Speculative Return request is being generated by the TCM as follows. When the Fetch Original request is processed by Request Processing Logic 502 before being stored in Command Storage 504 and prior to the request being forwarded to the MSU, Command-Type Compare Logic 510 decodes the request Command type. If the request is of the type "Fetch Original" or "Fetch Conditional" as in the current example, Command-Type Compare Logic 510 generates a signal on Line 511 to enable Speculative Return Generation Logic 512 to receive the request data from TLC Request Processing Logic via Line 514. Speculative Return Generation Logic 512 uses information included in the original request to generate a Speculative Return request.

A Speculative Return request can be one of two types. A "Return Original" Speculative Return is generated in response to a Fetch Original request, and will be issued to the non-requesting TLC 310 in the POD 120. This type of Return causes the TLC to obtain an exclusive copy of the cache line from the SLCs in the Sub-POD if that cache line is available within the Sub-POD. In contrast, a "Return Copy" Speculative Return is generated in response to a Fetch Conditional request. This type of Return is issued to the non-requesting TLC in the POD 120 to cause this TLC to obtain a shared copy of the requested cache line if the cache line is available within any SLC in the Sub-POD. This shared copy of the cache line may be shared between the TLC and one or more of the SLCs in the Sub-POD for read-only purposes. According to the current example, a Speculative Return of type Return Original is generated in response to the Fetch Original request.

Speculative Return Generation Logic also generates a destination address field to be included in the Speculative Return to identify the target of the Return request. As mentioned above, the non-requesting Sub-POD within the same POD as the Sub-POD making the request will always be the target of any Return request. In the current example, Sub-POD 210A of POD 120A issued the Fetch Original Command, and the Speculative Return request will therefore be provided to Sub-POD 210B of the same POD 120A. Speculative Return Generation Logic also copies the same Job Number included in the Fetch request along with additional request information to the Speculative Return. The format of the Speculative Return will be discussed further below. Once generated, a Speculative Return request remains stored in Storage Device 524 until it can be processed by MSU Function Processing Logic 516.

MSU Function Processing Logic 516 receives the Speculative Return functions from Speculative Return Generation Logic 512 via Line 518. MSU Function Processing Logic also receives other functions from the MIs 130A–130D that are temporarily stored in Input Storage Devices shown as MSU IN 0 520A, MSU IN 1 520B, MSU IN 2 520C, and MSU IN 3 520D, respectively. These requests received from the MSUs include Return Functions provided to initiate the return of data. MSU Function Processing Logic processes the MSU-generated requests along with the Speculative Returns according to a predetermined priority scheme, and routes the requests to the appropriate one of the Output Interfaces 410B or 410C. Note that Output Interfaces 410A and 410D are not used to provide Speculative Returns or MSU-generated Return requests to I/O Modules because I/O Modules are never the recipients of such requests. As discussed above, in the preferred embodiment of Platform 100, I/O Modules are allowed to retain cache lines until the I/O Modules return the data to the MSUs of their own accord. In an alternative embodiment in which I/O Modules are not allowed to retain cache lines that have been requested by another unit, and further in which additional levels of memory are coupled to the I/O Buffers 240, a Speculative Return command is routed by MSU Function Processing Logic to each of the Output Interfaces 410A–410D that is not associated with the requesting unit. It may be further noted that in yet another, expanded embodiment, additional I/O Modules 140 and additional Sub-PODs 210 could be coupled to Command Function Routing Logic, in which case additional Output Interfaces would be available to receive the Speculative Return command. In this example, the Speculative Return command would be issued on Output Interfaces 410A, 410C, and 410D.

In an embodiment in which Speculative Return commands are issued to the I/O Modules, these commands are processed in a manner similar to that used by the Sub-PODs 210. That is, the most recent copy of any stored ones of the requested data signals would be retrieved from lower memory levels for storage in I/O Buffers 240 so that this copy is readily available for later retrieval by the MSU.

Speculative Return Generation Logic 512 is coupled via Lines 522A–522D to each of the Input Storage Devices MSU IN 0 520A, MSU IN 1 520B, MSU IN 2 520C, and MSU IN 3 520D, respectively. This allows each of the pending Speculative Returns stored in Storage Device 524 to be compared to the Return requests received from the MSUs. If an MSU-generated Return request having the same Job Number as one of the pending Speculative Returns is received, the pending Speculative Return is invalidated, and the entry is removed from Storage Device 524. This will be discussed further below.

For purposes of the current example, it will be assumed the Speculative Return destined for Sub-POD 210B associated with the Fetch Original request is selected for processing by MSU Function Processing Logic 516 before the Return Purge function is received from MSU 110A for this request. This request will be handled by TLC 310 of Sub-POD 210B in the manner to be discussed below.

Figure 6:
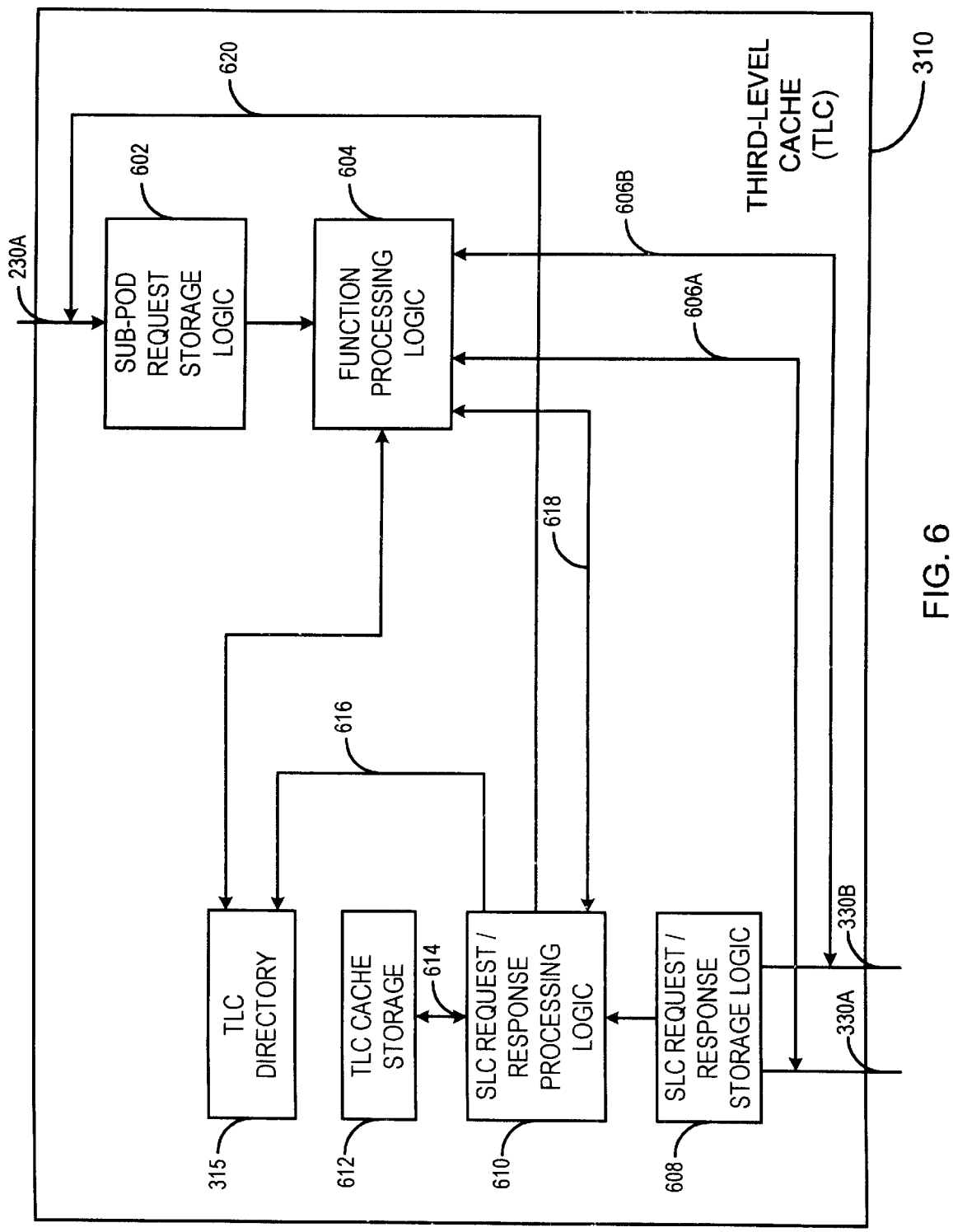
FIG. 6 is block diagram of the Third Level Cache.

FIG. 6 is block diagram of the Third Level Cache 310. Requests from the TCM 220 are received via Sub-POD Interface 230A and are stored temporarily in Sub-POD Request Storage Logic 602. These requests include both those containing the MSU-generated functions, and the TCM-generated Speculative Returns. Function Processing Logic 604 retrieves requests from Sub-POD Request Storage Logic according to a predetermined priority scheme. For each request, Function Processing Logic determines whether a corresponding entry exists for the requested cache line in the TLC Directory 315. If an entry exists, and if the TLC Directory indicates the cache line is exclusively owned by the TLC, Function Processing Logic determines which of Bus(es) 330A and/or 330B must be probed to retrieve the cache line. The Bus Probe operation will be issued on one or both of Lines 606A and/or 606B to be provided to one or both of Buses 330A and/or 330B, respectively. Additionally, if the requesting unit is requesting exclusive access of the cache line, the cache line data will be purged from the SLCs.

In the above scenario, it may be noted that a Bus Probe operation is only performed if the cache line state is "Exclusive". That is, a Speculative Return operation is not initiated if the cache line state as stored in the TLC is set to "Shared", or if the TLC has already flushed the data to the MSU. In the latter case, a copy may reside in a SLC 360 within the Sub-POD 210, but the existence of the SLC copy is not recorded in the TLC because the associated TLC copy was aged out of TLC memory. In this instance, the SLC copy will be retrieved using an MSU-generated Return operation instead of a Speculative Return. This design choice is made to minimize unnecessary Bus Probe operations in those instances in which it is not known whether the target Sub-POD does, in fact, store a copy of the cache line. In an alternative embodiment, a Bus Probe operation could be performed regardless of the cache line state.

According to one embodiment of the invention, a cache line in the MSU is not the same size as a cache line stored in the SLC. This may be the case when Platform 100 is adapted for use with "off-the-shelf" processors having internal cache line sizes of 32 bytes, versus the cache line size of 64 bytes utilized by the MSU of the preferred embodiment. In this instance, the TLC will store cache line status indicating the state of both halves of the 64-byte cache line. If either half of the cache line is exclusively owned, the Bus Probe operation will be performed to the one of the Buses 330A or 330B associated with the copy of the cache line half. If both halves are each owned by different SLCs residing on different ones of Buses 330A or 330B, the Bus Probe operation will be performed to both Buses 330A and 330B.

For purposes the current example, it will be assumed the entire 64-byte cache line is exclusively owned by SLC 360A which is coupled to Bus 330A via FSB Logic 380A. Function Processing Logic 604 therefore encodes a value on Bus 330A to indicate that a bus probe operation is being performed. FSB Logic 380A and 380B, which are constantly snooping the Bus 330A for requests, detect the bus probe operation, which is passed to the respective ones of the SLCs 360A and 360B to determine if the cache line is resident in either of these cache memories. The SLC may be required to obtain the cache line from the associated FLC 355 within the respective IP 350 if the cache line has been modified within the FLC. Any local copy within the FLC is then marked as invalid, and the SLC returns the cache line to the TLC. In this example, SLC 360A returns the cache line via FSB Logic 380A to TLC 310 along with an indication that the return is in response to the Speculative Return function.

A cache line received from TLC 310 is stored temporarily in SLC Request/Response Storage Logic 608. This cache line will be retrieved by SLC Request/Response Processing Logic 610 and written to TLC Cache Storage 612 via Line 614. Additionally, updated cache line status will be provided on Line 616 to TLC Directory 315 to reflect that TLC 310 now owns the latest copy of the cache line in anticipation of a pending Return operation.

While the Speculative Return operation is being completed in the TLC 310, the Return Purge function is transferred to MSU IN 0 520A, and is eventually routed via MSU Function Processing Logic 516 to the TLC. In a manner similar to that described above with respect to the Speculative Return request, this request is stored in Sub-POD Request Storage Logic 602 of TLC 310, and is eventually selected for processing by Function Processing Logic 604. Function Processing Logic retrieves the cache line information from TLC Directory 315, which indicates the latest copy of the cache line has already been retrieved and is resident in TLC Cache Storage 612. As a result, Function Processing Logic 604 provides a signal on Line 618 indicating that SLC Request/Response Storage Logic 608 is to read the cache line from TLC Cache Storage 612 and provide the data on Line 620 to Sub-POD Interface 230A. The cache line data will be forwarded to MI 130A with the appropriate Return command.

In the current example, if the Speculative Return has not been executed when the Return Purge function is received, the TLC 310 would perform the Bus Probe operations in a manner that is similar to execution of the Bus Probe operations following the reception of the Return Purge function. However, an SLC owning the cache line completes in-progress operations to the cache line prior to returning the data to the TLC, and the return operation can therefore require a substantial amount of time to complete. Thus, the execution of the Speculative Return function allows the Return Purge function to be completed in much less time than would have otherwise been required.

In some instances, a Speculative Return command that is generated by Speculative Return Generation Logic 512 will be pending in the TCM when the associated Return function is received from the MSU. This could occur, for example, if the MSU Function Processing Logic 516 is servicing a large number of higher priority requests, causing the Speculative Return to remain unprocessed for an atypically long period of time. In this instance, the TCM will provide the MSU-generated Return function to the TLC, and the Speculative Return will be discarded. The Speculative Return is not needed in this instance. In fact, issuing this function will initiate one or more unnecessary bus probe operations in the TLC, which will actually slow throughput in this instance. As discussed above, this situation is detected by comparing each of the Return functions stored in an Input Storage Device 520A–520D to those stored in Storage Device 524 via Interfaces 522A–522D, respectively. A Speculative Return function having a Job Number Field that is equivalent to an MSU-generated Return function is removed from the Storage Device 524.

The above-described example discussed a Return Original Speculative Return that is generated by Speculative Return Generation Logic 512 in response to a Fetch Original command. If a Sub-POD issues a Fetch Conditional command, Speculative Return Generation Logic instead generates a Return Copy Speculative Return. This type of return has a similar format to that described above with respect to Return Original Speculative Returns, differing only in the Function Field, which indicates a Return Copy operation. A Return Copy request is handled in a manner similar to that described above with respect to Return Original operations. The request is provided by MSU Function Processing Logic 516 to a Sub-POD to be processed by TLC 310. As is the case with the Return Original Speculative Return described above, the Return Original Speculative Return is only completed if the TLC Directory cache line state is "Exclusive". The operation is aborted if the cache line state is "Shared", or if the cache line status is not stored in the TLC Directory 315.

In the current example, it will be assumed the entire cache line is exclusively owned by SLC 360A. Therefore, the TLC performs a Bus Probe operation to Bus 330A. In this instance, however, the Bus Probe operation is a shared Bus Probe instead of the exclusive Bus Probe operation performed in the foregoing example. The shared Bus Probe operation indicates that the SLC 360 owning the cache line may retain a read-only copy of the cache line while returning cache data to the TLC. The TLC Directory 315 is updated to reflect whether the TLC retains a read-only copy of the cache line, and the cache line is written to TLC Cache Storage 612. This cache line is then available in the TLC when an associated MSU-generated Return function is provided from the TCM 220 to the TLC, and the cache line can be returned to the MSU without delay.

As discussed above, a Sub-POD issues a Fetch Conditional command to gain a copy of an operand. When this command is received by the MSU, an optimization algorithm is executed to determine the type of copy, read-only versus exclusive, that is granted to the requesting Sub-POD. Therefore, when the MSU receives a Fetch Conditional command, and if a Return function must be issued to obtain the cache line, either a Return Purge or Return Keep Copy function may be issued based on the results of the algorithm execution. If a Return Purge function is issued to a Sub-POD that has already executed an associated Return Copy Speculative Return operation, it will be noted that the correct cache line access type will not be available when the TLC executes the Return Purge function. That is, execution of the Return Copy Speculative Return results in the TLC obtaining a read-only copy. However, a Return Purge function requires the return of an exclusive copy. As a result, an additional exclusive bus probe operation must be performed to gain the exclusive access. In this instance, the Speculative Return operation does not benefit performance. However, use of a Return Copy Speculative Return for Fetch Conditional commands is a design choice which takes into account the optimization algorithm, and seeks to minimize the number of instances in which the TLC unnecessarily requires the associated SLCs to purge cache line data.

FIG. 7 is a block diagram illustrating the format of requests as provided by the TCM to the MSU. This format is generated by TLC Request Processing Logic, and includes Address Field 702 to indicate the cache line address associated with the request. The Command Field 704 indicates the type of request, and includes the various type of Fetch requests. As discussed above, the Job Number Field 706 is an encoded value used by both the TLC and SLC to match each request to the associated response. Bus Field 708 and TLC Field 710 identify which Sub-POD or I/O Module associated with a given POD is making a request.

FIG. 8 is a block diagram illustrating the format of requests provided by the MSU to the TCM. This format includes the Address Field 802 which is copied from the original request, and which indicates the cache line address associated with the request. The Function Field 804 identifies the type of function that is being requested by the MSU, and may include various types of Return Functions or a Purge Function. Job Number Field 806 is copied from Field 706 of the original request. Bus and TLC Fields 808 and 810, respectively, identify the requesting unit as a particular I/O Module or TLC associated with one of the PODs. These Fields are copied from Fields 708 and 710, respectively, of the request. Finally, POD ID Field 812 and Destination Address Field 814 are added to the original request by the MSU. The POD ID identifies the POD responsible for issuing the original request, and the Destination Address Field identifies the TLC 310 that is to receive the MSU-to-TCM request.

The format illustrated in FIG. 8 describes the fields included in the MSU-to-TCM requests. Similar fields are included in the Speculative Returns generated by Speculative Return Generation Logic 512. The values included in Fields 702, and 706 through 710 of the original request are provided by TLC Request Processing Logic 502 to Speculative Return Generation Logic and are copied to the Speculative Return. The Speculative Return Function in Field 804 is generated by Speculative Return Generation Logic along with the value provided in Destination Address Field 814. As discussed above, the Destination Address Field 814 identifies the non-requesting one of the TLCs 310 in the POD 120. The POD ID Field 702 is not needed for Speculative Return functions, and therefore this Field can be set to any value.

FIG. 9 is a table summarizing the types of Speculative Return Functions that are generated by the TCM in response to receiving various ones of the Fetch commands from a Sub-POD. Column 902 illustrates types of Fetch commands. Column 904 includes the type of Speculative Return Functions generated in response to the reception of an associated one of the Fetch commands. Column 906 indicates TLC cache line status, and Column 908 indicates the type of bus probe operations performed as the result of the Speculative Return requests. As indicated by this table, a Speculative Return is not generated as a result of a Fetch Copy command. A TLC Bus Probe operation for this type of request is initiated when the TLC receives the MSU-generated Return function. This is a design choice which takes into consideration the fact that in many cases, a read-only copy of a cache line may be provided directly by the MSU without the need to issue a Return function. The execution of a Speculative Return in these instances will unnecessarily increase traffic on Buses 330A and 330B, and thus this operation is not initiated for Fetch Copy commands.

In contrast to Fetch Copy commands, Return Original Speculative Returns are issued when the TCM 220 receives a Fetch Original command. This is illustrated in the Row two of the table of FIG. 9. If the Return Original command is issued for a cache line exclusively owned by the TLC, exclusive Bus Probe operations are performed to provide the data from Buses 330A and/or 330B to TLC 310. Finally, as illustrated by Row three of the table, Return Copy Speculative Returns are issued when the TCM receives a Fetch conditional command. If the requested cache line is exclusively owned by the TLC, shared Bus Probe operations are performed to provide the data to the TLC.

Figure 10:
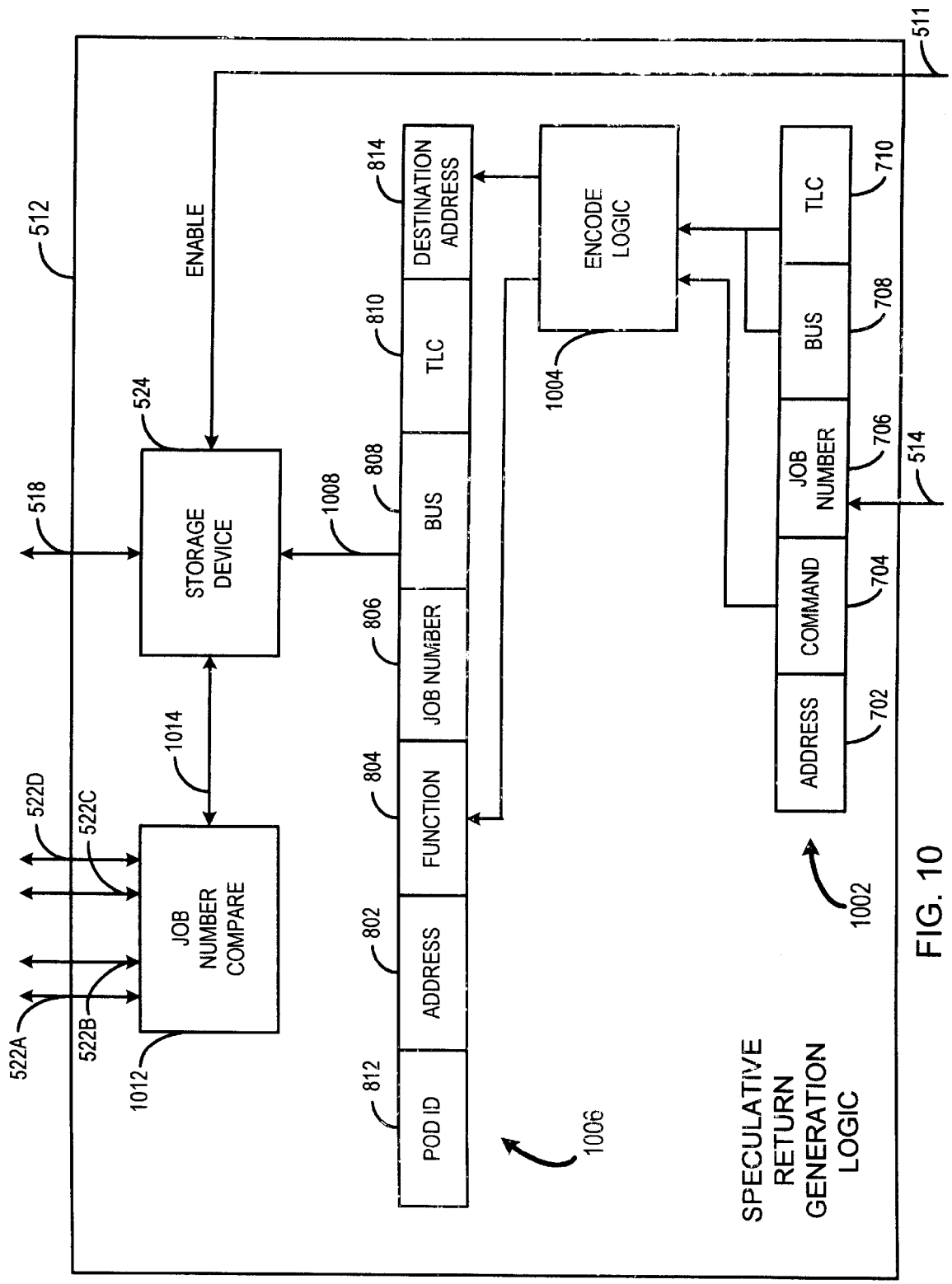
FIG. 10 is a block diagram of the Speculative Return Generation Logic.

FIG. 10 is a block diagram of the Speculative Return Generation Logic. A request including a Sub-POD command is received on Line 514 in the format shown in FIG. 8 and illustrated as request 1002 of FIG. 10. Encode Logic 1004 receives the Bus and TLC Fields 708 and 710 identifying the requesting unit. These fields are used to generate the Destination Address Field 814 to identify the other (non-requesting) TLC in the Sub-POD. Additionally, Encode Logic generates the Speculative Return function Field 804 according to the type of command received in Command Field 704. These two fields generated by Encode Logic are included with Fields 702 and 706 through 710 to provide the request format shown in FIG. 9 and illustrated as request 1006 of FIG. 10. A request of this format is provided on Line 1008 to Storage Device 524, which is enabled to receive the request via the enable signal provided on Line 511. As discussed above, Command-Type Compare Logic 510 generates this enable signal when the Fetch request is a Fetch Conditional or Fetch Original request.

A request is removed from Storage Device 524 when control lines provided on the interface shown as Line 518 are asserted by MSU Function Processing Logic 516 of FIG. 5. A request is selected from MSU Function Processing logic via Line 518 for servicing in the manner discussed above. Requests stored in Storage Device 524 may also be invalidated by Job Number Compare Logic 1012. This invalidation occurs if any of the stored requests received on Line 1014 have a predetermined relationship to any MSU-generated request received on Lines 522A–522D. In the preferred embodiment, this relationship is "equivalent to". Job Number Compare Logic removes requests from Storage Device 524 to prevent a Speculative Return function from being issued to a Sub-POD after an MSU-generated Return function associated with the same cache line has already been issued to the Sub-POD.

The above-described Speculative Return system issues a Speculative Return request when the TCM 220 receives either a Fetch Original or Fetch Conditional request from a Sub-POD 210. According to an alternative embodiment of this system, Speculative Returns could also be performed for Fetch requests initiated by I/O Modules 140. In this case, Command-Type Compare Logic 510 would enable Speculative Return Generation Logic 512 to generate Speculative Returns for I/O Fetch and I/O Copy request types as well as Fetch Original and Fetch Conditional request types.

While various embodiments of the present invention have been described above, it should be understood that they have been presented by way of example only, and not as a limitation. Thus, the breadth and scope of the present invention should not be limited by any of the above-described exemplary embodiments, but should be defined only in accordance with the following Claims and their equivalents.

What is claimed is:

1. For use in a directory-based memory system including a main memory coupled to multiple cache memories, each of the cache memories being capable of generating fetch requests to obtain data signals from the main memory, the main memory being capable of issuing return requests to retrieve a copy of any of the requested data signals from any of the multiple cache memories to be provided to a requesting one of the cache memories, a speculative return system, comprising:

a speculative return generation logic circuit coupled to receive a fetch request from any of predetermined ones of the multiple cache memories, and in response to each said fetch request, to generate a speculative return request to a predetermined non-requesting one of the cache memories; and a function processing logic circuit coupled to receive from said speculative return generation logic circuit each said speculative return request, and in response thereto, to cause said predetermined non-requesting one of the cache memories to retrieve from associated other ones of the cache memories coupled to said predetermined non-requesting one of the cache memories any of the data signals requested by said fetch request and that are stored by said associated other ones of the cache memories, whereby any of the data signals transferred to said predetermined non-requesting one of the cache memories is more readily available for retrieval by the main memory in response to an issued return request.

2. The system of claim 1, and further including a command-type compare logic circuit coupled to said speculative return generation logic circuit to enable said speculative return generation logic circuit to generate ones of said speculative return requests in response to only predetermined ones of the fetch requests.

3. The system of claim 1, and further comprising:

multiple ones of said speculative return logic circuits each to generate ones of said speculative return requests;

multiple ones of said function processing logic circuits, each of said function processing logic circuits coupled to receive a speculative return request from any respectively associated one of said multiple speculative return logic circuits to be provided to a respectively associated predetermined non-requesting one of the cache memories, each said respectively associated predetermined non-requesting one of the cache memories being further respectively coupled to other ones of the cache memories, and wherein in response to each said speculative return request, each said function processing logic circuit causes said respectively associated predetermined non-requesting one of the cache memories to retrieve, and to store, any of the data signals requested by said speculative return request and that are stored by said respectively coupled other ones of the cache memories.

4. The system of claim 1, wherein said speculative return generation logic circuit includes a storage device to store each said speculative return request until each said speculative return request can be provided to said predetermined non-requesting one of the cache memories.

5. The system of claim 4, wherein said speculative return generation logic circuit is coupled to receive any of the return requests issued by the main memory to said predetermined non-requesting one of the cache memories, and further including circuits to delete any stored said speculative return request if said stored speculative return request is requesting the transfer of data signals that are also being requested by said return request received from the main memory.

6. The system of claim 1, wherein said speculative return generation logic circuit includes logic to generate a return-copy speculative return request, said return-copy speculative return request to cause said predetermined non-requesting one of the cache memories to retrieve a read-only copy of said data signals requested by said fetch request while allowing said associated other ones of the cache memories to retain a read-only copy of said data signals requested by said fetch request.

7. The system of claim 1, wherein said speculative return generation logic circuit includes logic to generate a return-original speculative return request, said return-original speculative return request to cause said predetermined non-requesting one of the cache memories to retrieve an exclusive copy of said any of the data signals requested by said fetch request and that are stored by said associated other ones of the cache memories while requesting that each of said associated other ones of the cache memories purge any copy of said data signals requested by said fetch request.

8. The system of claim 1, and further including a tag storage device coupled to said function processing logic circuit to store status indications associated with data signals stored in said predetermined non-requesting one of the cache memories, and whereby said function processing logic circuit includes circuits to read said tag storage device, and to thereafter cause said any of the data signals requested by the fetch request and that are stored by said associated other ones of the cache memories to be retrieved from said associated other ones of the cache memories only if the status indications associated with said any of the data signals requested by the fetch request indicate a predetermined status.

9. A hierarchical memory system, comprising:
   a main memory to store data signals;
   multiple first storage devices each coupled to said main memory each to make requests to retrieve ones of said data signals from said main memory, and wherein said main memory initiates a return request in response to each of ones of said requests to retrieve a latest copy of requested ones of said data signals from one or more of said multiple first storage devices to be provided to a requesting one of said multiple first storage devices; and
   a speculative return generation circuit coupled to at least two associated ones of said multiple first storage devices to receive requests made by either of said at least two associated ones of said multiple first storage devices, and in response to any received request, to generate a speculative return request to the other one of said at least two associated ones of said multiple first storage devices to cause said other one of said at least two associated ones of said multiple first storage devices to prepare to send any stored said latest copy of said requested ones of said data signals to said main memory.

10. The system of claim 9, and further including at least one second storage device coupled to said other one of said at least two associated ones of said multiple first storage devices, and wherein said other one of said at least two associated ones of said multiple first storage devices includes a circuit to retrieve said any stored latest copy of said requested ones of said data signals from said at least one second storage device in response to receipt of said speculative return request.

11. The system of claim 10, and further including a tag storage device coupled to said at least one second storage device to store status signals indicating the status of data signals stored in said at least one second storage device, and wherein said circuit to retrieve said any stored latest copy of said requested ones of said data signals only performs a retrieval operation if said stored status signals indicate a predetermined status associated with said any stored latest copy of said requested ones of said data signals.

12. The system of claim 10, and further including at least one additional level of hierarchical storage devices coupled to said at least one second storage device, and wherein said other one of said at least two associated ones of said multiple first storage devices includes a circuit to retrieve said any stored latest copy of said requested ones of said data signals from said at least one additional level of hierarchical storage devices in response to receipt of said speculative return request.

13. The system of claim 9, wherein each of said multiple first storage devices is capable of making multiple types of requests, and wherein said speculative return generation circuit includes a compare circuit to enable said speculative return generation circuit to generate ones of said speculative return requests in response to predetermined ones of said multiple types of requests.

14. The system of claim 9, and further including at least two second storage devices each coupled to said other one of said at least two associated ones of said multiple first storage devices, and wherein said other one of said at least two associated ones of said multiple first storage devices includes a circuit to retrieve, in response to said speculative return request, predetermined first ones of said requested ones of said data signals from a first one of said at least two second storage devices, and to retrieve predetermined second ones of said requested ones of said data signals from a second one of said at least two second storage devices.

15. The system of claim 9, wherein said speculative return generation circuit includes a request storage device to store pending ones of said speculative return requests, and further including a function processing logic circuit coupled to said speculative return generation circuit to process said pending ones of said speculative return requests according to a predetermined priority scheme.

16. The system of claim 15, wherein said speculative return generation circuit includes a compare circuit to intercept return requests that are issued by said main memory to either of said at least two associated ones of said multiple first storage devices, said compare circuit to discard any of said pending ones of said speculative return requests stored in said request storage device associated with the same ones of said requested ones of said data signals as any of said intercepted return requests.

17. For use in a hierarchical memory system having a main memory coupled to multiple first storage devices, each of the multiple first storage devices to store data signals retrieved from the main memory, the hierarchical memory further including a speculative return generation system coupled to predetermined ones of the multiple first storage devices, a method of increasing throughput in the main memory, comprising the steps of:
   generating a request by a requesting one of the multiple first storage devices to retrieve requested data signals from the main memory;
   receiving said request by the speculative return generation system, and in response thereto, generating a speculative return request to a different one of the multiple first storage devices to prepare said different one of the multiple storage devices to return any stored ones of said requested data signals to the main memory;
   determining that the main memory does not store the most recent copy of said requested data signals;
   generating a return request from the main memory to said different one of the multiple first storage devices to retrieve a latest copy of said requested data signals from the main memory, whereby said latest copy of said requested data signals has been prepared for return to said main memory by said speculative return request.

18. The method of claim 17, wherein the hierarchical memory system further includes second storage devices coupled to said different one of the multiple first storage devices, and further including the step of retrieving, by said different one of the multiple first storage devices and in response to receipt of said speculative return request, a latest copy of said any stored ones of said requested data signals stored in one or more of said second storage devices.

19. The method of claim 18, wherein the hierarchical memory system includes a tag memory associated with said another predetermined one of the multiple first storage devices, and including the step of reading status signals from the tag memory to determine the state of said any stored ones of said requested data signals within said different one of the multiple first storage devices.

20. The method of claim 19, and wherein said step of retrieving said latest copy of said any stored ones of said requested data signals is performed only if said status signals indicate a predetermined status.

* * * * *